Figure 1:
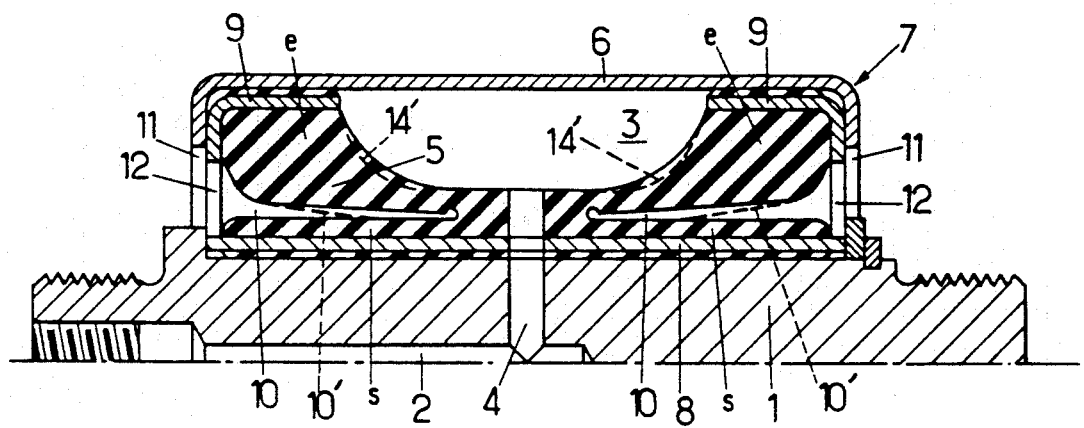

United States Patent
Girard et al.

[11] Patent Number: 5,170,997
[45] Date of Patent: Dec. 15, 1992

[54] RESILIENT ARTICULATION WITH VARIABLE STIFFNESS

[75] Inventors: André Girard, La Chapelle Du Noyer; Daniel Dubos, Asnieres, both of France

[73] Assignee: Hutchinson, Paris, France

[21] Appl. No.: 884,893

[22] Filed: May 18, 1992

Related U.S. Application Data

[63] Continuation of Ser. No. 620,484, Nov. 30, 1990, abandoned.

[30] Foreign Application Priority Data

Nov. 30, 1989 [FR] France ................. 89-15815

[51] Int. Cl.⁵ .................... F16F 13/00; B60G 11/62
[52] U.S. Cl. ...................... 267/35; 180/312; 248/562; 248/566; 248/575; 248/636; 267/64.28; 267/140.12; 267/219
[58] Field of Search ........... 267/35, 140.1 R, 140.1 C, 267/140.2, 219, 64.28; 180/300, 313, 902; 248/562, 566, 575, 634, 636

[56] References Cited

U.S. PATENT DOCUMENTS

| | | | |
|---|---|---|---|
| 2,926,011 | 2/1960 | Slemmons et al. | 267/64.27 |
| 4,705,410 | 11/1987 | Broock | 267/141.2 X |
| 4,790,520 | 12/1988 | Tanaka et al. | 248/636 X |
| 4,840,359 | 6/1989 | Hamaekers et al. | 267/141.2 X |
| 4,861,005 | 8/1989 | Bausch | 248/562 X |
| 4,953,833 | 9/1990 | Schmidt et al. | 267/29 X |

FOREIGN PATENT DOCUMENTS

| | | | |
|---|---|---|---|
| 3214037 | 10/1983 | Fed. Rep. of Germany | 180/312 |
| 3730582 | 3/1989 | Fed. Rep. of Germany | |
| 841602 | 5/1939 | France | 267/141.2 |
| 2394715 | 1/1979 | France | |
| 22914 | 2/1982 | Japan | 267/64.27 |
| 103044 | 6/1984 | Japan | 248/636 |
| 208652 | 10/1985 | Japan | 267/219 |
| 2165027 | 4/1986 | United Kingdom | |

OTHER PUBLICATIONS

Patent Abstracts of Japan, vol. 10, No. 146 (M-482) (2203) May 28, 1985 and JP-A-61 2934 (Honda) Jan. 8, 1986.

Primary Examiner—George E. A. Halvosa
Attorney, Agent, or Firm—Larson and Taylor

[57] ABSTRACT

A resilient pressurized fluid articulation is disclosed which has variable stiffness, i.e. whose stiffness may be modified at will under the influence of an external agent. The articulation includes a resilient material block (5, 5a; 15, 15a) mounted between rigid bearing surfaces of a structure (7, 7a, 7b, 7c) which contains it. At least two of these surfaces of the block are movable with respect to each other in at least one direction, under the action of external forces acting in this direction. The resilient material block (5, 5a; 15, 15a) defines in the structure at least one chamber (3) adapted to be fed with pressurized fluid through a duct (2) opening to the outside. The block (3) also comprises at least one part (18, 18a) which is deformable under the effect of the pressure, deformation of the part then modifying the stiffness of the block in the direction.

6 Claims, 2 Drawing Sheets

RESILIENT ARTICULATION WITH VARIABLE STIFFNESS

This application is a continuation of application Ser. No. 07/620,484 filed Nov. 30, 1990, now abandoned.

The present invention relates to a resilient articulation with variable stiffness.

The intention is thus to design an articulation which can be used for different applications, particularly in the automobile field, and whose stiffness can be modified at will in at least one direction, under the influence of an external control agent, possibly automatically in a servo-control chain. A control agent will advantageously be formed of a pressurized fluid and the articulation will generally comprise a resilient material block mounted between rigid bearing surfaces of a structure which contains it, at least two of these surfaces being movable with respect to each other in at least one direction, under the action of external forces acting in this direction.

In accordance with the invention, so that a modification of the pressure of said fluid determines a corresponding modification of the stiffness of the resilient material block in the direction considered, said resilient material block defines in said structure at least one chamber adapted to be fed with pressurized fluid through a duct opening outside and said block comprises at least one part which is deformable under the effect of said pressure, deformation of said part modifying the stiffness of the block in said direction.

The invention may be implemented in several ways.

For example, said resilient material block may comprise at least one recess extending generally transversely with respect to said direction, so that the stiffness of said block increases or decreases in this direction when the pressure of said fluid, respectively increases or decreases, thus causing the two opposite walls of said recess to bear increasingly, or respectively decreasingly, on each other.

In another variant, based on the same general principle of deformation of the resilient block, a part at least of a lateral wall, inclined with respect to said direction, of said resilient material block, bears on a rigid lateral flange of said structure, this lateral wall being then able to straighten up under the effect of an increase of pressure, whereby the stiffness of said block in said direction increases or decreases depending, respectively, on whether the pressure of said fluid in the chamber increases or decreases.

In the frequent case where said structure as well as said resilient material block has an axis of symmetry of revolution, the articulation may be further characterized in that said direction is a radial direction, namely perpendicular to said axis and in that said duct is axial.

In such a case, said structure as well as said resilient material block may have a plane of symmetry perpendicular to said axis.

Embodiments of the invention will now be described by way of examples which are in no wise limitative, with reference to the FIGS. 1 to 4 of the accompanying drawings which are all axial half sections of the articulations.

In all these figures, an axial core has been referenced 1, which may serve as mounting axis, and through which passes axially a duct 2 for feeding pressurized fluid into the annular inner chamber 3. Chamber 3 is connected to duct 2 by one or more radial channels 4.

In the case of FIG. 1, it can be seen that chamber 3 is formed between a central peripheral groove of a resilient material block 5 and a cylindrical part of the external rigid wall 6 of structure 7, surrounding the shaft or core 1 and which holds this block 5 on this shaft. Block 5 is adhered to an inner mount comprising a central tube 8 fixed axially on core 1 and two external half rings 9 in abutment in the angles of the rigid wall 6.

Block 5 comprises two opposite V recesses 10, opening on to its two front ends and separated from tube 8 by thin parts or sole pieces s.

Since the external wall 6 has a large central opening 11, at each end, as also the two half rings 9 (openings 12), it can be seen that the external wall 6 of structure 7 may move radially with respect to shaft 1, under the effect of the radial forces, having any angular orientation, exerted on this wall.

Assuming that the operating conditions require an increase of the radial stiffness of this articulation, these conditions, appropriately detected, will determine an increase of the pressure of the fluid injected by ducts 2 and 4 into chamber 3.

It can then be seen that, with the volume of chamber 3 increasing, recesses 10 will tend to close again, the thick portions e of block 5 behave as beams with variable stiffness in flexion towards the shaft, these beams bearing increasingly on the sole pieces s of this block 5, all the more so the higher the pressure of the fluid injected into chamber 3 (the broken lines 10' and 14' show the deformation of block 5).

It will then be understood that the radial stiffness of block 5, i.e. of the whole of the articulation, will indeed increase over the whole of its periphery, as a function of the increase of the control pressure of the fluid injected into chamber 3.

Figure 2:
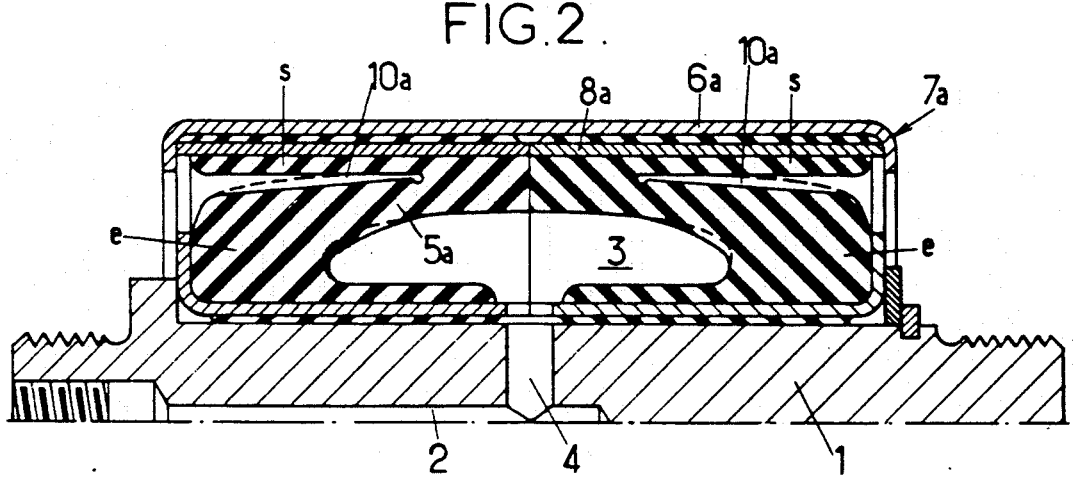

The embodiment of FIG. 2 operates exactly on the same principles, except that the base of the resilient material block is adhered, by its sole pieces s, on a tube 8a which is outside the resilient material block 5a, instead of inside, like tube 8.

Consequently, when the pressure in chamber 3 formed inside block 5 increases, the thick portions e of block 5a will further bend, but this time opposite to the shaft (see broken lines), further increasing their bearing pressure on the sole pieces s, and consequently increasing the overall radial stiffness of the articulation.

It goes without saying that in both cases (FIGS. 1 and 2), if the pressure of the fluid in chamber 3 decreases, the resilience of block 5 or 5a causes reopening of recesses 10 or 10a which reduces the radial rigidity of the articulation proportionately.

Figure 3:
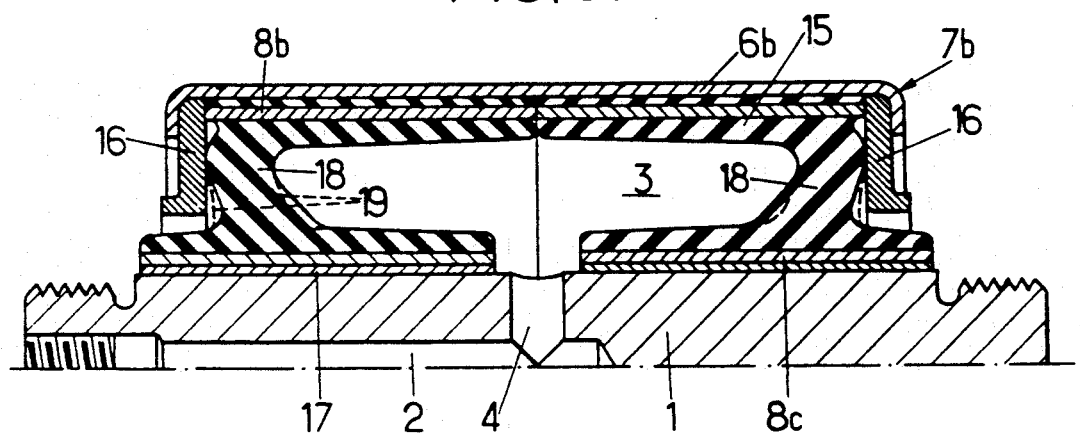
Figure 4:
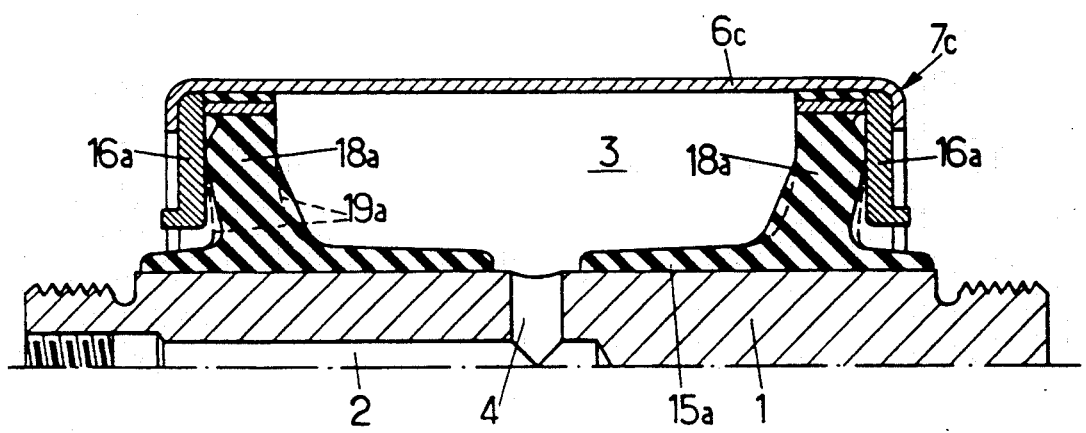

In the embodiments shown in FIGS. 3 and 4, the resilient material block has been referenced respectively 15 and 15a. In the embodiment of FIG. 3, it is in the form of a tubular hose formed of two jointing sections and the hollow inner portion of which forms the annular chamber 3. This hose 15 is adhered externally to a spacer tube 8b fixed between two end flanges 16 held in position by the edges of the external rigid wall 6b of structure 7b; on the inside it is adhered to an internal tube 8c engaged on a sleeve 17 of shaft 1.

In FIG. 4, the embodiment is similar but slightly different, the external wall of chamber 3 being formed directly by the external wall, here referenced 6c, of the holding structure referenced generally 7c.

In the two embodiments, it can be seen that block 15 or 15a bears endwise against flanges 16 or 16a via a lateral wall, respectively 18, 18a, which, at rest (in the absence of pressure in chamber 3), is inclined with respect to the plane perpendicular to the shaft, i.e. the radial plane.

Thus, when the pressure of the fluid feeding chamber 3 increases, the lateral walls 18 or 18a straighten up, i.e. draw closer to the radial plane, which increases their stiffness in this direction. The straightened up position of lateral walls 18 and 18a is indicated by the broken lines 19 and 19a in FIGS. 3 and 4.

On the other hand, when the pressure in chamber 3 decreases, the lateral walls of the resilient material block 15 or 15a regain the inclined position shown with continuous lines.

Such being the case, it can be seen that it is easy to make the radial stiffness of the articulations dependent on the pressure of a fluid.

We claim:

1. A resilient pressurized fluid articulation having an axis of revolution whose radial stiffness relative to the axis may be modified at will uniformly on all of a periphery thereof under the influence of an external agent comprising:
   a structure having opposed peripheral rigid bearing surfaces about the axis of revolution which are movable with respect to each other in any radial direction under the action of an external force acting in said any radial direction;
   a unitary resilient block mounted and extending between said rigid bearing surfaces, said resilient block including only one peripheral chamber and at least one recess extending generally transversely with respect to said any radial direction and forming opposite peripheral walls which are variably deformable; and
   only one duct opening outside of said structure and adapted to feed pressurized fluid to said peripheral chamber such that the radial stiffness of said block increases or decreases uniformly on all of the periphery of said block in said any radial direction when the pressure of the fluid respectively increases or decreases as said opposite walls are deformed radially to bear respectively increasingly or decreasingly against one another.

2. Resilient articulation according to claim 1, characterized in that said duct (2) is axial.

3. Resilient articulation according to claim 2 characterized in that said structure as well as said resilient material block have a plane of symmetry perpendicular to said axis.

4. A resilient pressurized fluid articulation whose radial stiffness may be modified at will uniformly on all its periphery under the influence of an external agent comprising:
   a structure having opposed rigid bearing surfaces which are cylindrical and coaxial about an axial axis thereof, said bearing surfaces being movable with respect to each other in any radial direction from the axial axis under the action of an external force acting in any radial direction;
   a unitary resilient block mounted and extending between said rigid bearing surfaces, said resilient block having an axis of symmetry of revolution about said axial axis and including a) only one peripheral chamber forming a hollow ring about the axis of symmetry and b) at least one recess forming a thin band about the axis of symmetry and which is elongated in the direction of the axis of symmetry so as to form opposite band walls which are variably deformable; and
   a wall deforming means for variably deforming said opposite band walls toward or away from one another, said wall deforming means including only one axial duct opening outside of said structure and adapted to feed pressurized fluid to said peripheral chamber whereby the stiffness of said block increases or decreases uniformly on all of the periphery of said block in the radial direction when the pressure of the fluid respectively increases or decreases as said opposite band walls are variably deformed and hence bear respectively increasingly or decreasingly against one another.

5. A resilient articulation as claimed in claim 4 wherein said recess is v-shaped in axial cross section.

6. A resilient articulation as claimed in claim 5 wherein there are two of said v-shaped recesses, each said recess being located on an opposite axial side of said block.

* * * * *